US012348734B2

(12) United States Patent
Tanner et al.

(10) Patent No.: US 12,348,734 B2
(45) Date of Patent: Jul. 1, 2025

(54) FINE GRAIN LOOKAHEAD ENHANCEMENT FOR VIDEO CODING

(71) Applicant: Intel Corporation, Santa Clara, CA (US)

(72) Inventors: Jason Tanner, Folsom, CA (US); James Holland, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 786 days.

(21) Appl. No.: 17/347,243

(22) Filed: Jun. 14, 2021

(65) Prior Publication Data
US 2021/0306640 A1    Sep. 30, 2021

(51) Int. Cl.
*H04N 19/14* (2014.01)
*H04N 19/126* (2014.01)
*H04N 19/139* (2014.01)
*H04N 19/172* (2014.01)
*H04N 19/177* (2014.01)
*H04N 19/196* (2014.01)
*H04N 19/577* (2014.01)

(52) U.S. Cl.
CPC ........... *H04N 19/14* (2014.11); *H04N 19/126* (2014.11); *H04N 19/139* (2014.11); *H04N 19/172* (2014.11); *H04N 19/177* (2014.11); *H04N 19/196* (2014.11); *H04N 19/577* (2014.11)

(58) Field of Classification Search
CPC .... H04N 19/126; H04N 19/139; H04N 19/14; H04N 19/172; H04N 19/176; H04N 19/177; H04N 19/196; H04N 19/577
See application file for complete search history.

(56) References Cited

U.S. PATENT DOCUMENTS

| | | | |
|---|---|---|---|
| 2015/0256850 A1* | 9/2015 | Kottke | H04N 19/513 375/240.16 |
| 2018/0376153 A1* | 12/2018 | Gokhale | H04N 19/147 |
| 2019/0349585 A1* | 11/2019 | Zhang | H04N 19/142 |

* cited by examiner

*Primary Examiner* — Mohammed S Rahaman
(74) *Attorney, Agent, or Firm* — Akona IP PC

(57) ABSTRACT

Techniques related to video coding using look ahead analysis and block based back propagation for block level quantization parameters are discussed. Such techniques include adaptively selecting frames subsequent to a target frame in a display order for use in the back propagation, propagating values to blocks of the target frame that are indicative of the importance of the blocks to the encode of the subsequent frames, and encoding the target frame using block level quantization parameters based on the propagated values.

21 Claims, 9 Drawing Sheets

FINE GRAIN LOOKAHEAD ENHANCEMENT FOR VIDEO CODING

BACKGROUND

In video compression/decompression (codec) systems, compression efficiency, video quality, and processing efficiency are important performance criteria. For example, visual quality is an important aspect of the user experience in many video applications and compression efficiency impacts the amount of memory storage needed to store video files and/or the amount of bandwidth needed to transmit and/or stream video content. Furthermore, processing efficiency, including processing speed and use of limited computational resources, is an important aspect of encode as there is a continuing desire to encode more quickly and with less power. For example, a video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression and high processing efficiency is desirable. In some contexts, lookahead is employed as a bitrate control (BRC) algorithm which adjusts the quantization parameter (QP) on a frame basis in anticipation of upcoming scene complexity.

There is an ongoing concern with improving video quality in the context of lookahead processing. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
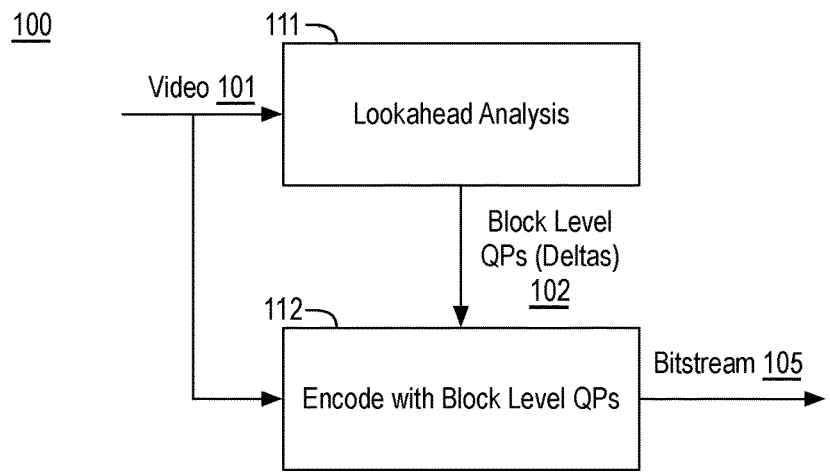
FIG. 1 is an illustrative diagram of an example system for coding video to generate a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding and, in particular, to adaptively adjusting block based quantization parameters using lookahead analysis. Such techniques adjust quality and/or compression within a frame to improve objective and subjective quality based on future lookahead information.

Video coding quality may be improved by performing lookahead analysis and adjusting video encode using the resultant lookahead information. In particular, the techniques discussed herein back propagate the probability of a block (of a current or target frame) being referenced in the future so bits are spent where they are more likely to be more efficient. Such techniques may be deployed in any coding context such as standards compliant coding inclusive of HEVC (High Efficiency Video Coding/H.265/MPET-H Part 2), AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8/VP9/AV1 family of codecs, etc. The disclosed techniques provide optimizations for fine grain lookahead techniques inclusive of intra block distortion similarity scaling, use of re-encoding a low delay B (LDB) lookahead pass with a random access pattern for final encode, use of a reduced number of frames for back propagation, and others.

FIG. 1 is an illustrative diagram of an example system 100 for coding video 101 to generate a bitstream 105, arranged in accordance with at least some implementations of the present disclosure. As shown in FIG. 1, system 100 includes a lookahead analysis module 111 and an encode module 112 (labeled encode with block level QPs). In some embodiments, block level QP decisions are made using lookahead analysis and applied during encode. For example, the lookahead analysis may include downsampling frames of video 101, generating frame and block level statistics using the downsampled video frames and generating block level QPs using the statistics and techniques discussed herein. In some embodiments, such block level QP decisions may be adjusted during encode. As used herein, the term block level QP indicates a QP to be applied to a block within a frame but not necessarily any other blocks in the frame. A block level QP may be indicated using any suitable technique or techniques such as assigning a block level QP to each block, assigning a QP delta (i.e., a difference with respect to a frame level QP) to each block, or the like.

Each of lookahead analysis module 111 and encode module 112 are illustrated separately for the sake of clarity. However, such modules may be implemented in the same or different encode software, hardware, firmware, etc. System 100 provides video compression and system 100 may be a portion of a video encode system implemented via a computer or computing device such as a computing system or the like. For example, system 100 receives video 101 (e.g., video data) and generates bitstream 105 that may be decoded by a decoder to generate a decompressed version of video 101. Bitstream 105 may be compatible with a video compression-decompression (codec) standard such as, for example, HEVC, AVC, VVC, VP8, AV1, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

System 100 may include other modules or sub-modules not shown for the sake of clarity of presentation. For example, system 100 may include a downsampler and an encode controller, a transform module, a quantization module, an intra prediction module, an inter prediction module, a reference picture buffer, a scanning module, an entropy encoder, etc., which may be implemented via lookahead analysis module 111 and/or encode module 112. Such modules are known to those of skill in the art and are not discussed further herein with respect to FIG. 1 for the sake of clarity of presentation.

As shown, system 100 receives video 101. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames, blocks, and sub-blocks having various sizes for the sake of clarity of presentation. As used herein, a block or coding unit may be any size and shape such that it includes a plurality of pixel samples (typically square or rectangular) in any suitable color space such as YUV. Furthermore, a block or coding unit may have sub-blocks or prediction units, which also may be characterized as blocks depending on context. Also a block, sub-block, or coding unit may be optionally divided into a transform block or transform unit for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for coding. Such coding units may be partitioned into transform units (TUs) for transform that also take the form of rectangular blocks (typically square) having variable sizes. However, as discussed, the block of video data may include any block of video data and any coding standard may be used.

The encode performed by system 100 includes compressing a series of frames (pictures) by converting still images taken by a camera, generated by a computer or other source into a compressed format. Each picture is divided into blocks, which are predicted based on spatial or neighbor pixels (intra prediction) or from a prior frame that has similar content (temporal or inter prediction). Due to temporal redundancy in most forms of video, there is significant compression. For example, a 1920×1080 video at 30 fps would be 1.5 Gbps uncompressed but can be effectively compressed down to 10 Mbps with good visual quality.

When each frame or picture is divided into blocks, a decision is made on a per block basis. First, there is a maximum block size (e.g. 64×64 for HEVC). Furthermore, that block can be encoded as intra or inter. An intra block can be predicted from the top pixels, the left pixels or multiple angle combinations of neighbor pixels. For inter blocks, a motion vector can point to a future frame or a past frame or both future frames The motion vector can point to different regions of the frame to match the object motion frame to frame. Each of these decisions can be made at the maximum block size or at a subdivided block level. For example, if a 64×64 is divided into 16×16s, each of those 16×16 blocks can have different intra modes and/or inter motion vectors.

Once the decision is made for a block, it can be encoded into a bitstream. The most relevant part for the bitstream coding is taking the predicted mode (inter or intra prediction) and making a difference block between the block and the predicted block. That difference block or error is forward transformed into the frequency domain and the resultant coefficients are quantized. The amount of quantization will determine how similar the predicted block will be to the original source block as well as how many bits it will take to encode that block. The more accurate the block, the more bits it will take and vice versa.

Such a tradeoff between bits and quality is needed because the video is to be compressed to either fit on a limited size physical media, streamed (e.g., over the internet) based on a users connection speed or available bandwidth, or the like. The mechanism used to regulate the amount of bits versus quality on a roughly per frame basis is rate control. Rate control may regulate the amount of bits versus quality by modulating the quantization parameter (QP), which controls the quantization amount discussed previously.

To make the rate control more accurate, future frames may be analyzed in a lookahead analysis. In lookahead analysis, frames are encoded often with a more performance enhanced encode configuration and/or a downscaled version of the content for performance reasons. With the encoding of the frames, the rate control can use the future frame sizes as a proxy to determine how to distribute the bits across up coming frames. For example, content that is relatively stable (e.g., does not vary much) can use a lower QP for improved quality which future frames will reference while content with more variation can save bits for future frames for when the content changes.

Techniques discussed herein use lookahead analysis module 111 to determine block level QPs 102 (which may be expressed as deltas from a frame level QP as shown). Block level QPs 102 are in turn used to encode video 101 to generate bitstream 105. Bitstream 105 may be any bitstream representative of video 101 such as an HEVC compliant bitstream or a bitstream compliant to any other codec. During encode of frames of video 101, any number of coding modes, coding unit partitions, transform unit partitions, and so on are evaluated to arrive at final coding modes for units or portions of video 101. Such final coding modes for video 101 as well as other coding information are provided in bitstream 105.

Figure 2:
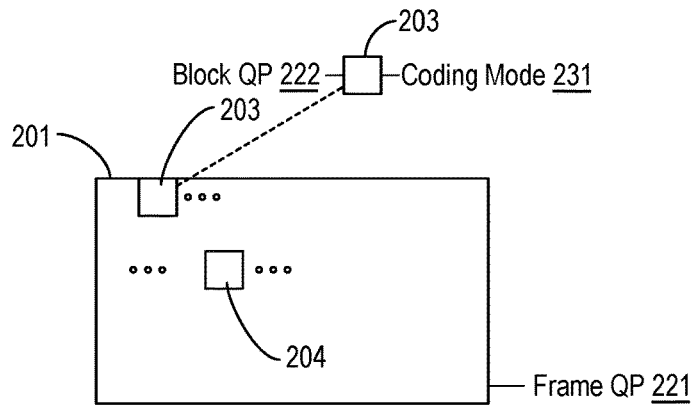
FIG. 2 illustrates an example video frame of video.

FIG. 2 illustrates an example video frame 201 of video 101, arranged in accordance with at least some implementations of the present disclosure. As shown, video frame 201 may be segmented into one or more blocks or portions as illustrated with respect to blocks 203, 204. Blocks 203, 204 may be further divided into coding or prediction sub-blocks and transform blocks during encode. In some embodiments, video frame 201 is segmented into coding blocks, which are segmented into transform blocks. However, any picture structure may be used that divides the frame into macroblocks, blocks, units, sub-units, etc. As used, herein, the term block may refer to any partition or sub-partition of a video picture that is at the sub-picture and sub-slice level. For example, a block may refer to a coding unit.

As discussed, coding mode decisions are made for blocks of video frame 201 such as block 203 and block 204. For example, for each block of video frame 201, a coding mode is selected as illustrated with respect to coding mode 231 as selected for block 203. Furthermore, for each block of video frame 201, a block level QP is selected as illustrated with respect to block level QP 222 as selected for block 203. In some embodiments, block level QP 222 is a QP value used for quantization of block 203. In some embodiments, block level QP 222 is a QP delta value used to adjust frame level QP 221, with the modified QP value used for quantization of block 203. Herein, QP deltas are used in discussion for the sake of clarity of presentation.

Returning to FIG. 1, lookahead analysis module 111 gathers statistics for spatial and temporal complexity for some number of future frames (e.g., 40 future frames) relative to a current or target frame. For example, the future frames may be temporally future frames in a display order of video 101. In some embodiments, block based quantization enhancement uses those distortions on a block level for the future frames. Beginning at the farthest future frame (e.g., the furthest frame away), for each block, the intra distortion measure for the block is compared to the temporal distortion measure for the block. Any suitable distortion measures may be used such as spatial variance (e.g., variance of the block itself) for intra distortion and temporal variance (e.g., a comparison of the block and a collocated block in a prior frame) for temporal variance. If the temporal distortion for the block is less than the spatial variance, the temporal distortion is used as the block distortion, otherwise the intra distortion is used.

A propagation value (e.g., an amount that is propagated) for the block is then generated as shown in Equation (1):

$$prop(x, y) = 1 - \frac{dist(x, y)}{intra(x, y)} \quad (1)$$

where prop is the propagation value, dist is the lower of the inter (temporal) and intra (spatial) distortion for the block at position (x,y). As can be seen in Equation (1), if intra wins (i.e., dist=intra), the propagation value is 0. If the temporal distortion wins, the propagation value or the amount that is propagated is the percent the temporal distortion reduces relative to the intra distortion (e.g., as a proxy for the spatial distortion).

The propagation value (e.g., amount that is propagated) from the frame is the block values scaled according to the intra distortion and accumulated propagation from prior frames as shown in Equation (2) and then summed across the frame (not shown):

$$\text{finalprop}(x,y) = \text{prop}(x,y) * (\text{intra}(x,y) + \text{accumulatedprop}(x,y)). \quad (2)$$

where finalprop is the final propagation value, intra is the intra distortion in the current fame, and accumulated prop is the accumulated propagation from prior processed frames (e.g., further future frames in the display order). It is noted that the first frame from lookahead and the non-referenced frames have no accumulated propagation.

The final propagation amount is projected to the reference frame (or target frame) according to the motion vector location between the propagating frame and the reference frame. In some instances, the motion vector is not be aligned to the block boundaries such that the propagation amount is scaled to the four blocks relative to how much they align with the interpolated motion vector location. For example, a propagation value (or part of a propagation value) for a block in a reference frame may be the incoming final propagation value multiplied by the fraction of overlap between the blocks. A total propagation value for a block in the reference frame may be a sum of such scaled (based on area overlap) propagation values.

Such processing is repeated by lookahead analysis module 111 for all frames in the lookahead period (or selected frames in the lookahead period as discussed below) until it reaches the current or target frame. Such propagation and tracing using motion vectors indicates how much a block in the current or target frame is used as a reference in the future frames. A block level QP such as a QP delta is determined as provided in Equation (3):

$$QPoffset(x, y) = \text{strength} * \log_2\left(\frac{\text{finalprop}(x, y)}{\text{intra}(x, y)}\right) \quad (3)$$

where intra is the spatial distortion in the current or target frame and strength is a weighting coefficient that may be used to vary the importance of the propagation in the rate distortion and QP determination. Such processing provides a flow to determine block level QPs 102 for a current or target frame. Such processing may be performed for all frames in a video sequence or selected frames in a video sequence. Such techniques provide a lower QP for blocks that are likely to be referenced in future frame encodes, which in turn will improve the quality as future frames will make block based prediction using a higher quality reference block.

Figure 3:
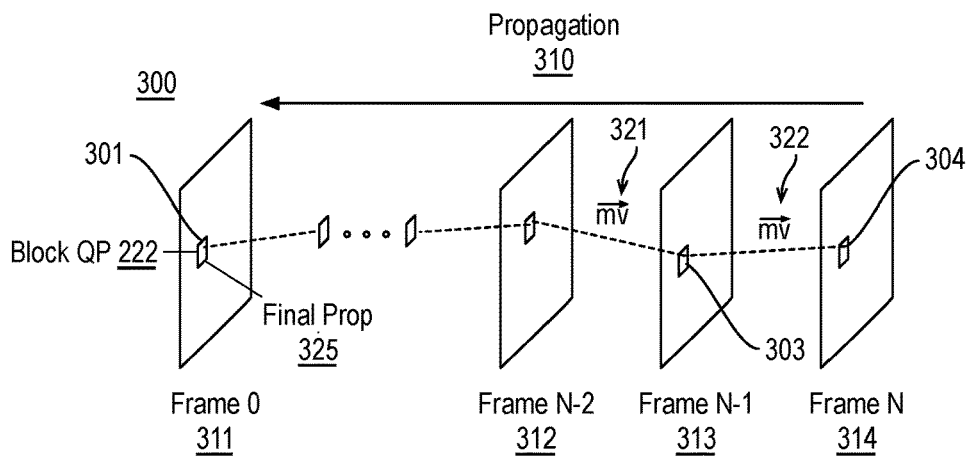
FIG. 3 illustrates exemplary propagation of block based propagation values for a video sequence.

FIG. 3 illustrates exemplary propagation 310 of block based propagation values for a video sequence 300, arranged in accordance with at least some implementations of the present disclosure. As shown, for a exemplary target frame 311 (e.g., frame 0), a number of future frames such as future frames 312, 313, 314 in a display order are analyzed using lookahead analysis module 111. As discussed, any number of future frames such as 10, 20, 40, or the like may be analyzed. In some embodiments, the number of analyzed future frames is adaptive to the content of video sequence 300 as discussed further herein below.

For each block 304 of furthest future frame 314 (e.g., frame N), a spatial distortion value (intra) and a temporal distortion value (inter) are estimated using lookahead techniques such as frame downsampling, simplified encode, and the like. For block 304, the spatial distortion value and the temporal distortion value are then compared. If the spatial distortion value is less than the temporal distortion value (e.g., the spatial distortion value wins), no propagation value is propagated. If the temporal distortion value is less than the spatial distortion value (e.g., the temporal distortion value wins), a propagation value in accordance with Equation (1) is propagated. As used herein, the term propagation value indicates a statistic or value pertinent to the importance of inter distortion for a block. As discussed, in some embodiments, a propagation value is a percent (or proportion) the distortion reduces relative to the intra distortion (e.g., as a proxy for the spatial distortion.

As shown, the propagation value is then propagated using motion vector 322 to a block 303 of a next future frame 313 (frame N-1). In some embodiments, when the block boundaries do not align, the incoming propagation value is scaled based on the overlap between block 303 and block 304 as mapped using motion vector 322, as illustrated further herein with respect to FIG. 4. It is noted multiple blocks of frame 314 may map (in part) to block 303 of frame 313 with the multiple scaled values being summed as an accumulated propagation value. The same processing is then repeated for block 303 to determine a propagation value for block 303, which is propagated along with any accumulated propagation value using motion vector 321 to a block of a next future frame 312 (frame N-2). Such processing is further repeated through a block 301 of target frame 311. As discussed, the accumulated propagation value for block 310 is used to generate a final propagation value 325 in accordance with Equation (2). Final propagation value 325 is then used in accordance with Equation (3) to determine a block level QP offset (e.g., block level QP 222) for block 301.

Such processing is repeated for blocks of future frames 1 to N to generate a block level QP for each block of frame 311. With reference to FIG. 1, such block level QPs 102 are then used in the full encode of video 101 via encode module 112.

Figure 4:
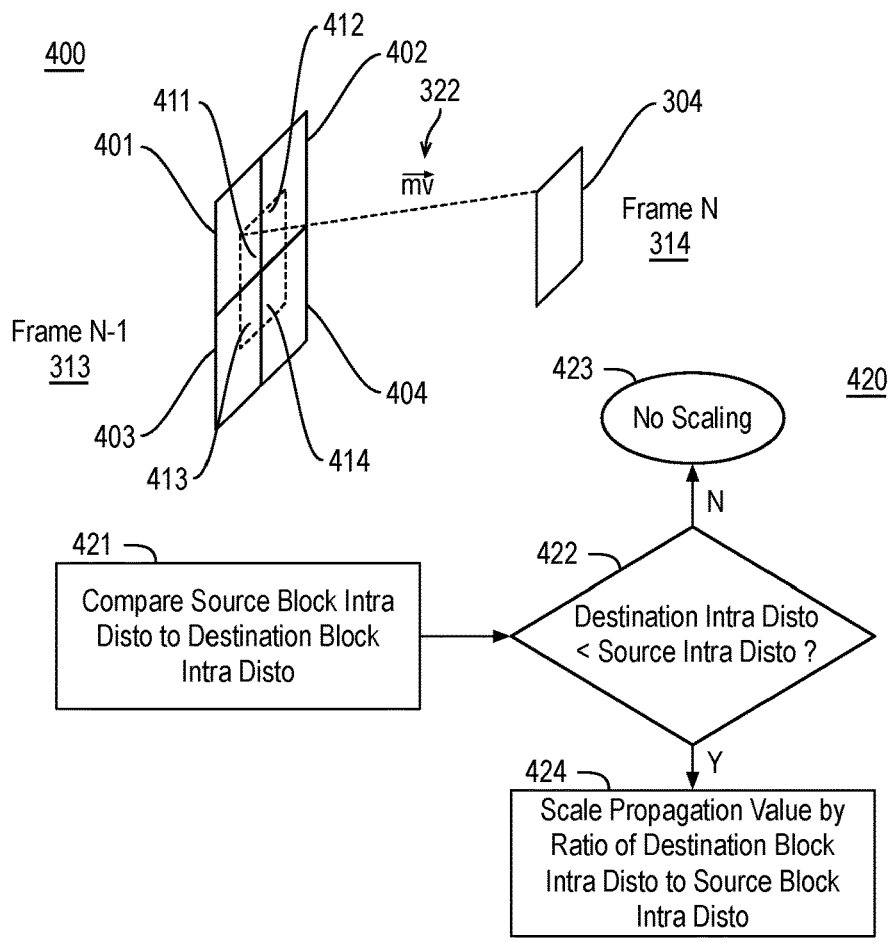
FIG. 4 illustrates exemplary propagation of block based propagation values including intra similarity scaling.

FIG. 4 illustrates exemplary propagation 400 of block based propagation values including intra similarity scaling, arranged in accordance with at least some implementations of the present disclosure. As shown, in some embodiments, motion vector 322 maps block 304 of frame 314 to multiple blocks 401, 402, 403, 404 of frame 313. Although illustrated with respect to mapping between frames 314, 313, the techniques discussed with respect to propagation 400 may be applied between any frames. Further block 304 may map to any number of blocks 401, 402, 403, 404 such as four or two blocks. Notably, a portion 411 of block 304 maps to block 401, a portion 412 of block 304 maps to block 402, a portion 413 of block 304 maps to block 403, and a portion 414 of block 304 maps to block 404.

In the context of propagation 400, intra similarity scaling is performed during back propagation. As block 304 is mapped or interpolated to corresponding blocks 401, 402, 403, 404, some of blocks 401, 402, 403, 404 can have mismatching levels of complexity. For example, a detailed building (as represented in one or more of blocks 401, 402, 403, 404) may be next to the sky (as represented in one or more others of blocks 401, 402, 403, 404). For example, temporal distortion can be low with high spatial distortion. Such instances results in a large propagation (e.g., a large value for prop) that can result in a large QP offset without intra similarity scaling as discussed herein. Without intra similarity scaling, regions or blocks of low complexity next to regions or blocks of high complexity and good propagation can get disadvantageously very strong QP deltas.

In some embodiments, intra similarity scaling includes comparing the intra distortion value from block 304 in future frame 314 to the intra distortion of each block (e.g., of blocks 401, 402, 403, 404) that is being propagated too. If the intra distortion is lower at the destination block 304, the propagation value is scaled based on the ratio of the intra distortion value of the destination block (e.g., each of blocks 401, 402, 403, 404) to the intra distortion value of the source block 304. Such techniques remove the extreme QP offsets that can otherwise be produced for improved the quality. In some embodiments, a propagation value is determined that is to be propagated from block 304 of frame 314 two or more of blocks 401, 402, 403, 404 of frame 313 and, in response to a spatial distortion of block 304 exceeding a spatial distortion of, for example, block 401, a propagation value for block 401 is scaled (e.g., multiplied) by a ratio of the propagation value for block 401 to the spatial distortion of block 304. In some embodiments, the propagation value for block 401 is scaled relative to the ratio. For example, the ratio may be applied based on a nonlinear curve. For example, a value of zero may be used if the ratio is greater than 20%. Notably, when a spatial distortion value of, for example block 402, the spatial distortion of block 304, no scaling is performed. It is noted that in any case, the propagation value is scaled by the percentage of overlap between block 304 and each of blocks 401, 402, 403, 404 in frame 313. Propagation using such intra similarity scaling may then be continued between any suitable frames as discussed herein to alter resultant block level QPs 102. In some embodiments, such intra similarity scaling is performed only at the target frame. For purposes of illustration, if a propagation value of 10,000 is being propagated from block 304 and block 304 and block 401 have an overlap of 10% (e.g., portion 411 is 10% of block 401 by area), the propagation value for block 401 is scaled to 1,000 (10,000× 10%). If the spatial distortion of block 304 is 10,000 and the spatial distortion of block 401 is 500, the propagation value is further scaled to 20 (1,000*500/10,000). It is noted such intra similarity scaling may be performed when block 304 perfectly aligns with a destination block and such spatial overlap scaling may be performed absent intra similarity scaling.

Process 420 provides exemplary intra similarity scaling techniques. Process 420 may be performed by a device (e.g., system 100 as discussed herein) to perform video coding using intra similarity scaling in back propagation processing. As shown, processing begins at operation 421, where a source block intra distortion (e.g., spatial distortion of block 304) is compared to a destination block intra distortion (e.g., spatial distortion of each of blocks 401, 402, 403, 404 in turn). As shown at decision operation 422, if the destination block intra distortion is less than the source block intra distortion, processing continues at operation 424, where a propagation value from the source block to the destination block is scaled by a ratio of the destination block intra distortion to the source block intra distortion. Returning to decision operation 422, if the destination block intra distortion is not less than the source block intra distortion, processing continues at operation 423 where no scaling is performed. Such processing may be repeated for each of blocks 401, 402, 403, 404 as well as for each source and destination block combination between frame 314 and frame 313.

Figure 5:
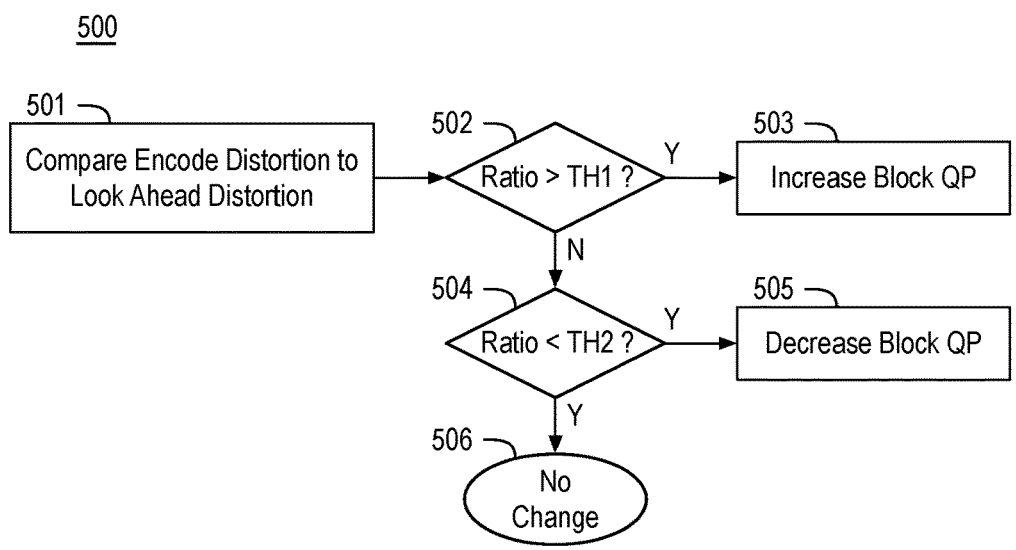
FIG. 5 illustrates an example process for full resolution temporal scaling in block based propagation.

FIG. 5 illustrates an example process 500 for full resolution temporal scaling in block based propagation, arranged in accordance with at least some implementations of the present disclosure. Process 500 may include one or more operations 501-506 as illustrated in FIG. 5. Process 500 may be performed by a device (e.g., system 100 as discussed herein) to perform video coding using full resolution temporal scaling in back propagation processing.

Notably, when lookahead pass is performed by lookahead analysis module 111, the lookahead analysis may advantageously (and typically) use downscaled frames for the pre-encoding pass of the lookahead to gather statistics for performance reasons such as increased speed. Such downscaling for lookahead purposes acts as a low pass filter that removes small amounts of details. As a result, some video sequences with noise can show a better temporal distortion than will be evident during the full resolution encode (i.e., as performed by encode module 112), which results in a lower QP than is ideal without use of full resolution temporal scaling as discussed herein.

In some embodiments, per block distortions and/or a frame level distortions are compared during full encode as performed by encode module 112. If the ratio between the full resolution distortion (at the block or frame level) is greater or lower than predetermined thresholds, the QP offset can be adjusted up or down, respectively. Such techniques prevent over runs for the rate control and improves the compression efficiency. In some embodiments, such techniques are performed only for target frame 311 (please refer to FIG. 3) at QP selection. In some embodiments, lookahead analysis as performed by lookahead module 111 uses downsampled input video and target frame 311 has a first distortion value based on the lookahead analysis. The first distortion value may be a frame level distortion value for target frame 311 or a block based distortion value for block 301. In either case, a second distortion value for target frame 311 is generated based on full resolution input video. In some embodiments, the first and second distortion values may be scaled based on the resolution difference. A ratio of the second distortion value to the first distortion value is then compared to first and second thresholds with the second threshold being less than the first threshold. If the ratio exceeds the first threshold, the block level QP for block 301 is increased. If the ratio is less than the second threshold, the block level QP for block 301 is decreased. The increase or decrease may be any suitable amount such as a single increment or decrement or an increase or decrease scaled based on the ratio of the second distortion value to the first distortion value. In some embodiments, in response to the ratio of the second distortion value to the first distortion value exceeding a threshold, one or more block level QPs are increased prior to encode of target frame 311. In some embodiments, in response to the ratio of the second distortion value to the first distortion value being less than a threshold, one or more block level QPs are decreased prior to encode of target frame 311.

Notably, process 500 provides exemplary full resolution temporal scaling techniques. Processing begins at operation 501, where an encode distortion (i.e., frame or block level distortion generated using full resolution video) of a target frame is compared to a lookahead distortion (i.e., frame or block level distortion generated using downsampled video) of the target frame. In some embodiments, a ratio of the encode distortion to the lookahead distortion is generated. Processing continues at decision operation 502, where a determination is made as to whether the ratio exceeds a first threshold. If so, processing continues at operation 503, where one or more block based QP values are increased. In some embodiments, block level distortion ratios between the encode and lookahead distortions are used to alter block level QPs. Returning to decision operation 502, if the ratio does not exceed the first threshold, processing continues at decision operation 504, where a determination is made as to whether the ratio is less than a second threshold that is less than the first threshold. If so, processing continues at operation 505, where one or more block based QP values are decreased. In some embodiments, block level distortion ratios between the encode and lookahead distortions are used to alter block level QPs. Returning to decision operation 504, if the ratio exceeds the second threshold (i.e., the ratio is between the first and second thresholds), processing continues at operation 506 where no changes are made to the block based QP value(s). Such processing may be repeated for each block of a target frame to alter block based QP values prior to encode as performed by encode module 112.

Figure 6:
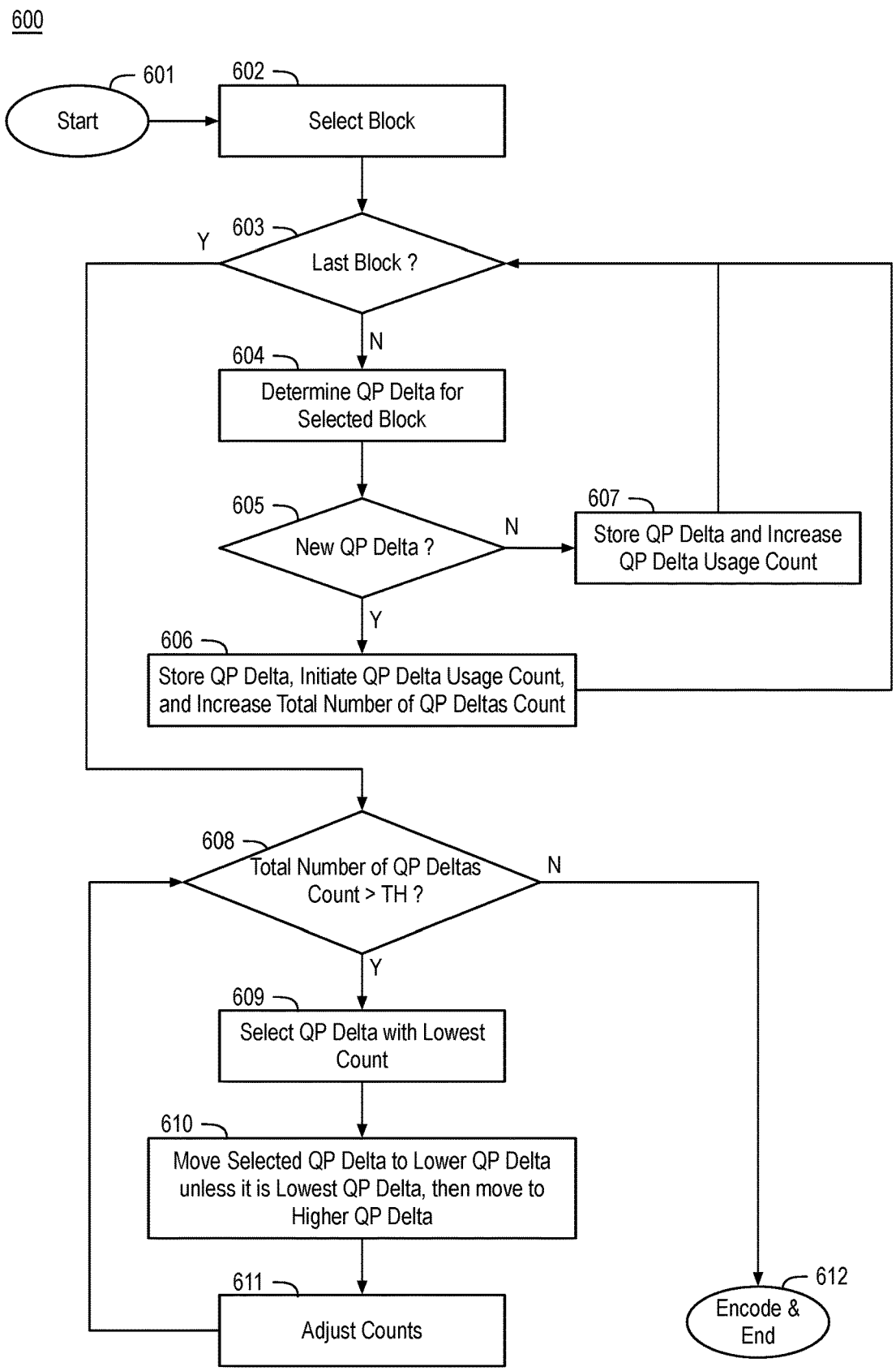
FIG. 6 illustrates an example process for adaptation to a limited number of block level quantization parameter offsets in block based propagation.

FIG. 6 illustrates an example process 600 for adaptation to a limited number of block level quantization parameter offsets in block based propagation, arranged in accordance with at least some implementations of the present disclosure. Process 600 may include one or more operations 601-612 as illustrated in FIG. 6. Process 600 may be performed by a device (e.g., system 100 as discussed herein) to perform video coding using adaptation to a limited number of block level quantization parameter offsets in back propagation processing. Although discussed with respect to block level QP offsets (or deltas), such techniques may be applied to block level QP values or any other values that effectuate block level QP.

Notably, in some contexts, fine grain lookahead techniques as provided by lookahead module 111 produce a variety of QP offsets for a frame, such as block level QPs 102. In some encode contexts, hardware interfaces or other limitations provide support for only a limited number of QP deltas per frame or for a particular encode batch or the like. The adaptive QP techniques discussed with respect to process 600 map the QP deltas produced by lookahead module 111 to a predetermined finite number of QP deltas. It is noted that while such techniques may provide for coding in the context of limitations on the number of QP deltas, it has also been determined that limiting the number of QP deltas per frame to a predetermined number provides increased subjective and objective video quality.

Notably, process 600 provides exemplary adaptation of block level QP deltas to a limited number of block level QPs in block based propagation. Processing begins at start operation 601, where a frame is processed, and at operation 602, where a block of the frame is selected. At decision operation 603, a determination is made as to whether the selected block is a last block to be processed. If not, processing continues at operation 604, where a QP delta or offset is determined for the selected block. Processing continues at decision operation 605, where a determination is made as to whether the QP delta is a new value (i.e., the QP delta value selected at operation 604 has not yet been assigned to any other block). If not, processing continues at operation 607, where the QP delta is stored as corresponding to the block and a usage count of the selected QP delta is incremented.

Returning to decision operation 605, if the selected QP delta has not yet been assigned or used, processing continues at operation 606, where the QP delta is stored as corresponding to the block, a usage count of the selected QP delta is initiated, and the total number of unique QP deltas count is incremented. For example, each available QP delta (e.g., in accordance with a codec) may be used by a block or not. For those that are used, a number of blocks that use the QP delta is tracked. Therefore, each unique QP delta that is in use has a corresponding usage count value indicating the number of blocks that use it. Furthermore, a total number of QP deltas usage count indicate the number of unique delta QP values that are in use. As shown, processing continues from such processing after the last block is processed as indicated at operation 603.

Processing then continues, with each block assigned a QP delta (or a QP delta of zero) and statistics providing the number of QP deltas used and the usage count for each of the QP deltas in use, at decision operation 608, where a determination is made as to whether the number of QP deltas in use exceeds a predetermined threshold. The predetermined threshold may be any suitable value such as 4 QP deltas, 8 QP deltas, or the like. If the number of QP deltas in use exceeds the threshold, processing continues at operation 609, where a QP delta with a lowest usage count is selected. Processing continues at operation 610 where the QP delta selected at operation 609 is moved to an immediately lower QP delta that is also in use, unless the QP delta selected at operation 609 is itself the lowest QP delta, in which case the QP delta selected at operation 609 is moved to an immediately higher QP delta. Thereby, a bias is provided to lower QP deltas in the adaptation to the threshold number of available QP deltas. Processing continues at operation 611 where the discussed counts are adjusted based on the movement of QP deltas performed at operation 610. Processing then continues at decision operation 608 until such processing reduces the total number of QP deltas (e.g., QP deltas count) to the threshold or maximum number of QP deltas available. When the threshold or maximum number of QP deltas available is met, processing ends at operation 612 where encodes is performed using the adjusted block based QP deltas (or block based QP values).

In some embodiments, while the QP deltas are being selected by lookahead analysis module 111, all of the QP deltas are stored and counted on a QP delta basis. If there are more QP deltas than the predetermined number of QP deltas (e.g., a maximum number of QP deltas), the QP delta with the minimum number of block instances (e.g., the QP delta used the least) is moved to an immediately lower QP delta that is also already being used, and the count is adjusted accordingly, unless QP delta with the minimum number of block instances is the minimum QP already being used, the QP delta with the minimum number of block instances is moved to an immediately higher QP delta that is also already being used. Such processing is repeated until the maximum number of QP deltas is met.

In some embodiments, selecting the block level QPs for encode includes receiving block level QPs for blocks of a target frame such that the received block level QPs include a particular number of unique block level QPs. When the number of unique block level QPs exceeds a predetermined threshold, the block level QP values of a set of the received block level QPs corresponding to a lowest number of unique block level QPs are altered. Such processing is repeated until an updated number of unique block level QPs does not exceed the threshold. The resultant, altered block level QPs are then used for encode of the frame. Notably, such block level QPs may be block level QP deltas (or offsets) or block level QP values, or the like.

In addition or in the alternative, with each frame determining one or more unique QP deltas, the QP offsets for each frame can have a wide range. In some embodiments, to provide more stability, a maximum QP delta may be determined for a frame. Then, each frame may use the maximum QP delta across a sliding window of twice the lookahead length (e.g., twice the number of frames used in the lookahead analysis). Such techniques reduce the amount of variance in the sequence and provides improved QP offset for the random access B frame depth.

Figure 7:
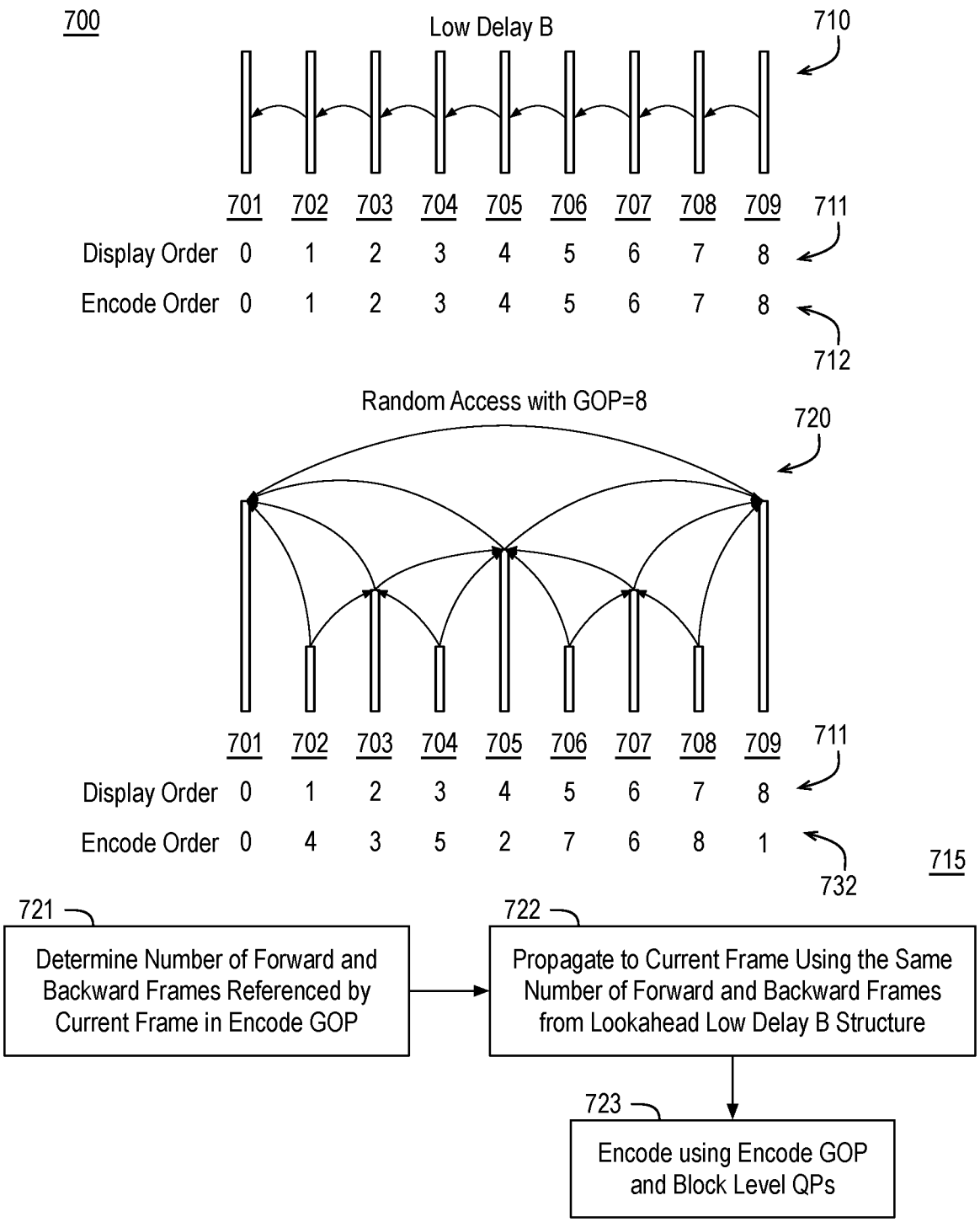
FIG. 7 illustrates exemplary mapping of single direction lookahead analysis to a bidirectional reference frame encode structure in block based propagation.

FIG. 7 illustrates exemplary mapping 700 of single direction lookahead analysis to a bidirectional reference frame encode structure in block based propagation, arranged in accordance with at least some implementations of the present disclosure. As shown, in some embodiments, a single direction coding structure 710 such as a low delay B (LDB) coding structure is used for lookahead analysis with respect to frames 701-709. In single direction coding structure 710, a display order 711 matches an encode order 712 and each frame may reference only a prior frame in display order 711 for motion estimation. In contrast, in an encode structure 720 such as a random access with group of picture (GOP) size 8 encode structure, an encode order 732 does not match display order 711 and, frames 701-709 may reference fames other than the frame immediate to it in display order 711. For example, frame 703 may reference frame 701 or frame 705, frame 706 may reference frame 705 and frame 707, and so on. Although illustrated with respect to a random access with GOP size 8, any suitable GOP structure may be used.

Notably, an initial pre-encoding pass as deployed by lookahead analysis module 111 may map a GOP structure for final encode as performed by encode module 112 such that a GOP structure may be adaptively selected or such that a more advanced GOP structure may be used. For example, an adaptive GOP structure such as encode structure 720 is better at handling changes in video content and can thereby obtain better compression efficiency. However, as discussed, the pre-encoding pass of lookahead analysis module 111 may be performed with low delay B (LDB) or single directional encoding, meaning backward only references.

To map LDB or single direction coding structure 710 to a random access (RA) coding structure such as encode structure 720, which has references both forward and backward, a mapping may be used. In some embodiments, the frame that will be encoded is used and a graph is created that records whether a frame is referenced or not. Each new frame in the forward path checks if the list 0 reference or list 1 reference connects to a reference frame. If it does, it is marked in the graph as a referenced frame. Each frame is processed in the lookahead list to mark the referenced frames. The number of forward and backward reference frames is counted and the number of forward and backward references are propagated according to their count. Notably, the reverse direction propagation needs to perform the forward propagation with inversion to determine the propagation values (e.g., instead of propagating the distortion, the accumulated propagation is propagated, etc.).

In some embodiments, a lookahead analysis uses a coding order matching a display order of a video sequence and an encode of the video sequence uses a group of picture (GOP) structure having a coding order other than the display order. In such contexts, a number of forward and backward reference frames are determined in the GOP structure for a first frame of the video sequence such that the forward and backward reference frames skip one or more frames in the display order. Propagation values may be propagated to a frame using the lookahead analysis values by propagation from forward and backward frames in the display order using the number of forward and backward reference frames from the GOP structure. That is, for each frame, the GOP structure is used to determine a number of forward reference frames and a number of backward reference frames (with forward and backward referring to display order with forward being in the direction of display) in the GOP structure. Then, propagation is performed for each frame using the number of forward frames and the number of backward frames but using frames in the lookahead order to determine the propagation values. For example, if the GOP has one forward reference frame, one lookahead frame is used but the forward reference frame and the lookahead frames do not match.

Using frame 705 as an example, in encode structure 720, frame 705 references one forward reference frame 709 and one backward reference frame 701. In propagation to frame 705 for purposes of determining block level QPs as discussed herein, propagation to frame 705 then proceeds as follows. In response to having one forward reference frame 709, one back propagation is performed from forward frame 706 to frame 705 with frame 706 being used, in a sense, as a proxy for frame 709. Similarly, in response to having one backward reference frame, one forward propagation is performed from backward frame 704 to frame 705 again with frame 704 being used in place of frame 701. such processing repeats for each frame in encode structure 720 such that a number of forward and backward reference frames are used based on the GOP structure while the propagation values and propagation itself are performed using that number of forward and backward reference frames as selected using single direction coding structure 710. Such techniques provide for high quality propagation results while advantageously using a high efficiency lookahead coding structure. In some embodiments, back-propagation from a forward frame includes dividing a propagation value of a block of the forward frame to two or more values for corresponding blocks of a destination frame (e.g., based on spatial overlap) as discussed with respect to FIG. 4. In an inverse manner, in some embodiments, forward-propagation from a backward frame includes merging propagation values of blocks of the backward frame to a single value for a block of the current frame. With reference to FIG. 4, for example, such forward propagation may merge propagation values from blocks 401, 402, 403, 404 into a singe value for block 314 such that the propagation values from blocks 401, 402, 403, 404 are weighted in accordance with the spatial overlap of regions 411, 412, 413, 414, respectively.

Process 715 provides exemplary mapping of single direction lookahead analysis to a bidirectional reference frame encode structure in block based propagation. Processing begins at operation 721, where a number of forward reference frames and a number of backward reference frames referenced by a current frame are determined in an encode GOP structure. It is noted that the GOP structure frames may be processed in any order to determine the discussed mapping. In some embodiments, the mapping is determined for each frame prior to moving to propagation for the GOP. For example, the GOP structure mapping may be determined prior to runtime and deployed during runtime for propagation.

Processing continues at operation 722, where propagation to the current frame is performed using the number of forward and backward reference frames determined at operation 721 but based on the frames in the order of the lookahead low delay B structure. That is, propagation structure to a frame is generated using the GOP structure but the propagation of actual values based on that propagation structure uses values (e.g., intra and inter distortions and motion vectors) from the lookahead low delay B structure (e.g., single reference with encoding order matching display order). Such processing is repeated for each frame in the GOP structure of the video sequence. Such techniques are used to determine block level QP values for each frame as discussed herein.

Processing continues at operation 723, where final encode is performed using encode module 112 using the selected GOP structure (e.g., encode structure 720) using the selected block level QPs. As discussed, the block level QPs are selected based on numbers of reference frames from the reference pattern of the GOP structure but using statistics and propagation from the lookahead analysis structure.

As discussed, back propagation may be performed from a future frame such as frame 314 (please refer to FIG. 3) back through each frame (e.g., frames 313, 312, and so on) to a current or target frame such as frame 311. In some embodiments, such back propagation may select some frames for propagation while skipping others and/or limit the number of future frames used, in some cases based on the content of the video sequence.

Figure 8A:
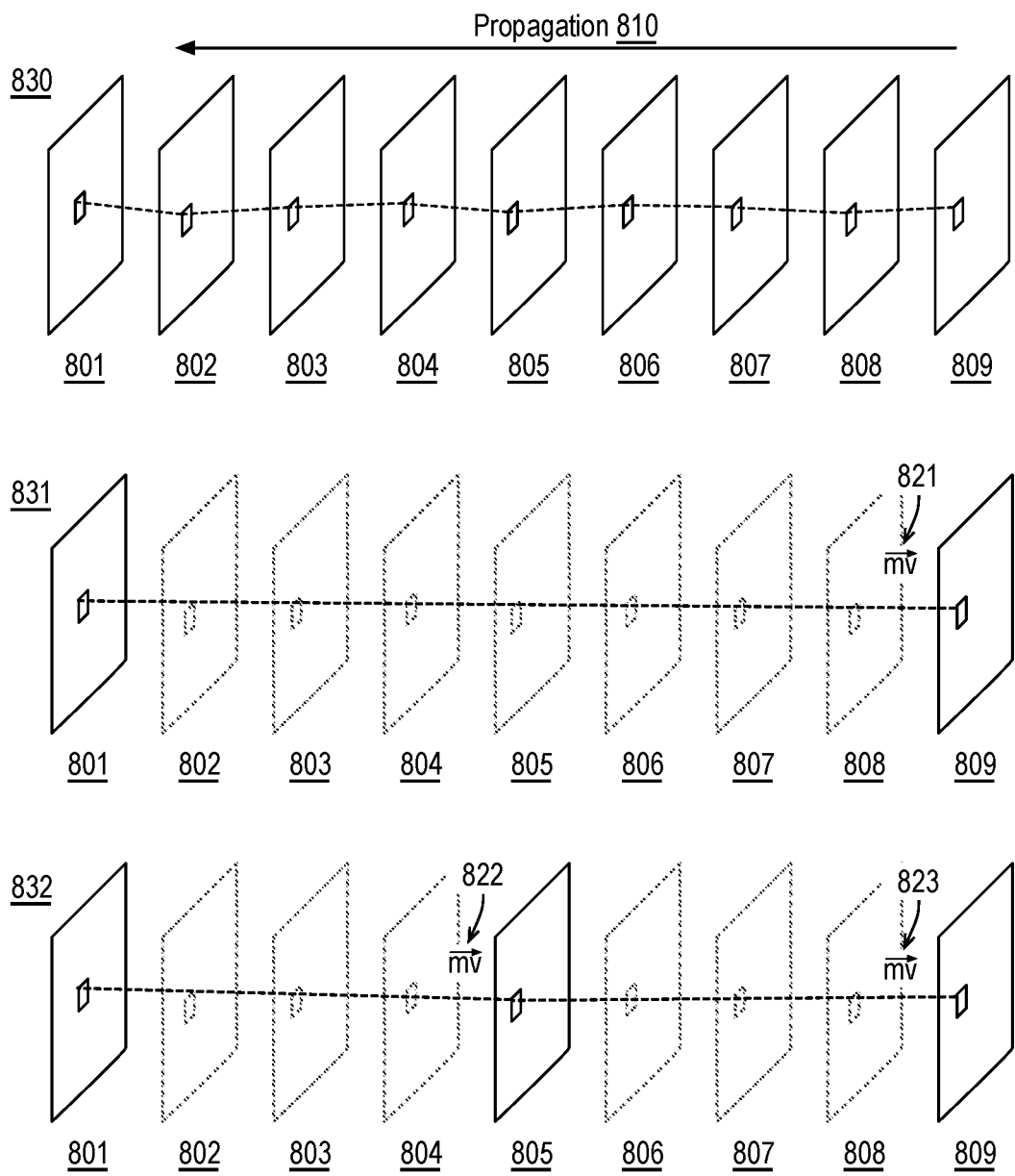
FIGS. 8A and 8B illustrate exemplary back propagation structures for block based propagation.
Figure 8B:
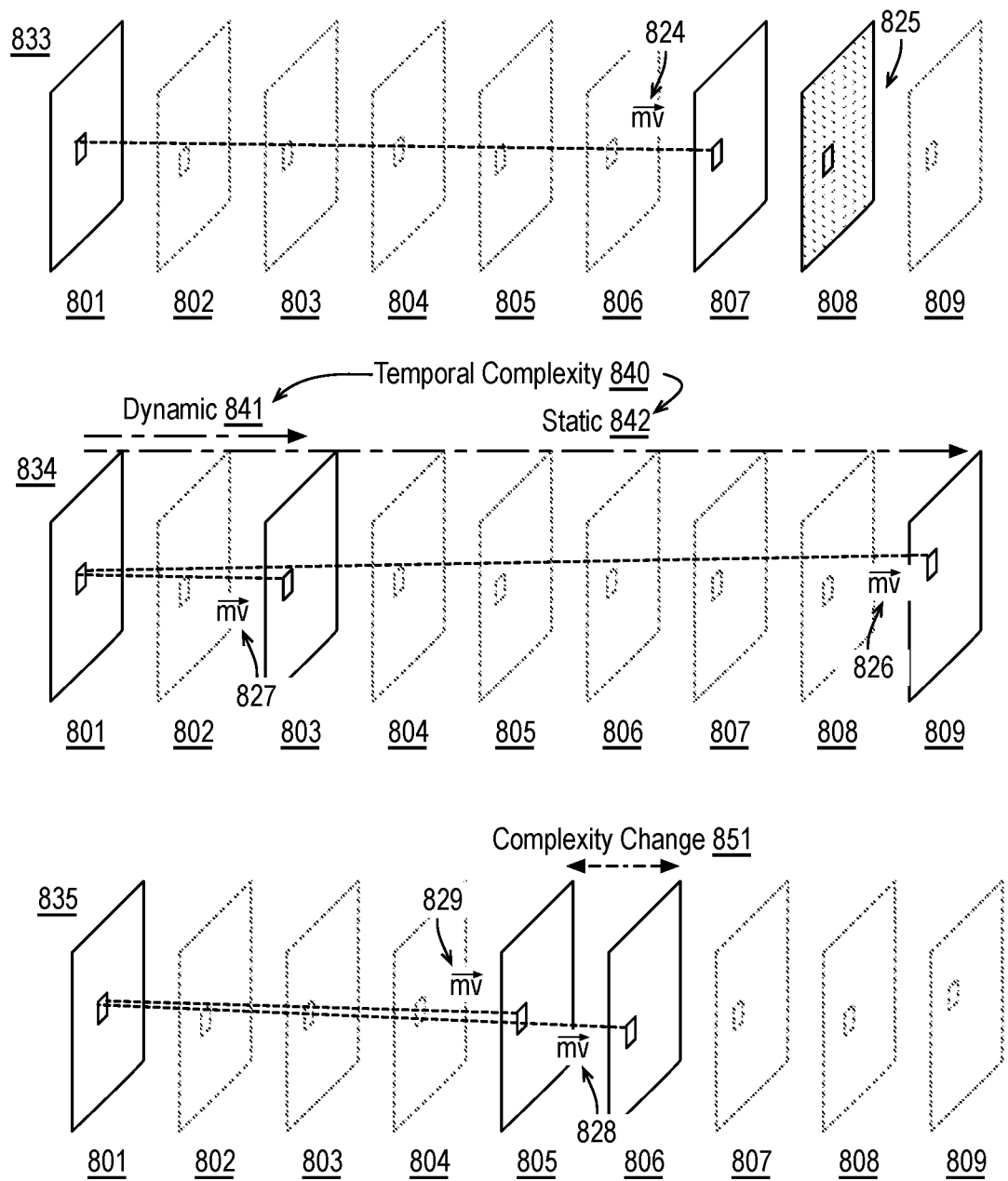

FIGS. 8A and 8B illustrate exemplary back propagation structures for block based propagation, arranged in accordance with at least some implementations of the present disclosure. First, for reference, back propagation structure 830 includes frames 801-809 having back propagation using each frame as discussed herein. It is noted that the discussed GOP structure mappings may also be deployed using the following back propagation structures using the same or similar techniques. For example, a back propagation structure may be selected in the low delay B structure domain (as illustrated) or in the selected GOP structure domain and a suitable mapping may be provided.

The back propagation structures discussed with respect to FIGS. 8A and 8B may improve processing efficiency and flexibility for different video content. Notably, in some coding contexts such as hardware based encoding, the time it takes to back propagate across multiple frames can be time consuming and add additional latency. Furthermore, some low latency encode contexts do not have future frames and/or time to process future frames as needed. In some embodiments, performance may be improved in low latency encode contexts by processing a single future frame in the lookahead analysis. For example, a single pre-encoding frame for a target frame (e.g., 8 frames in the future) may be performed while skipping all other intervening frames and propagation may be performed assuming constant propagation for the intervening frames (e.g., 8 frames in this example). For example, a full back propagation structure as shown with respect to back propagation structure 830, would need pre-encoding lookahead for 8 frames, for example, and then back propagation across all frames with frame N referencing frame N-1, frame N-1 referencing frame N-2, and so on to frame N-8. In contrast, in a performance optimized mode, frame N will refer to frame N-8. In such embodiments, the back propagation is only for the one frame but loops Equation (2) for the number of frames (i.e., 8 in this example). In other low latency applications, techniques may include forward propagation assuming continual propagation. For example, multiple past frames may be used to derive a probability for a future block based on the continuity of the motion and the accuracy of the prediction. Based on that probability, the QP will be assigned using the probability and future propagation instead of the back propagation.

Back propagation structure 831 illustrates an example performance optimized mode such that lookahead analysis (e.g., pre-encoding) is performed for frame 809 relative to frame 801 (e.g., generating motion vectors such as motion vector 821) while lookahead analysis is bypassed for frames 802-808. As discussed, in the performance optimized mode, frame 809 will refer to frame 801 for pre-encoding (e.g., motion estimation) such that the back propagation is only for the one frame but the back propagation loops Equation (2) for the number of frames (i.e., 8 in this example) to generate final propagation values for frame 801, which are in turn used to generate QP deltas using Equation (3). In some embodiments, one or more frames are selected for back propagation processing such that selecting the one or more frames includes selecting the one or more frames at an interval that skips one or more intervening frames. In such contexts propagation of propagation values as discussed herein is absent use of the intervening frames.

Such back propagation using skipped or bypassed frames may bypass any number of frames by being deployed at any frequency such as every eight frames as shown in back propagation structure 831 or every four frames as shown in back propagation structure 832. As shown, in back propagation structure 832, frame 809 references frame 805 to generate motion vectors such as motion vector 823 and frame 805 references frame 801 to generate motion vectors such as motion vector 822. As with back propagation structure 831, back propagation structure 832 may provide propagation only for the indicated frames but with looping over a number of frames based on frequency.

Turning now to FIG. 8B, in some embodiments, frame back propagation may be adaptive to video content. In some embodiments, the selection of forward frames for use in back propagation may be limited to those frames before a selected scene change frame. The scene change frame detection may be performed using any suitable technique or techniques. In some embodiments, once a scene change frame is detected, the frames selected for use in back propagation are limited to only those prior to the scene change frame (e.g., the scene change frame and further frames are not used).

As shown with respect to back propagation structure 833, a scene change frame 825 is detected as frame 808 (e.g., any of frames 801-809 and so on may be detected as a scene change frame). In some embodiments, based on detection of scene change frame 825, only frames 802-807 are used for back propagation to frame 801. In the illustrated example, back propagation is performed only from frame 807 (using motion vector 824), which is immediately prior to scene change frame 825, in accordance with performance optimized mode processing. However, any number of frames 802-807 may be used for back propagation to frame 801 including all of frames 802-807, a certain frequency of frames 802-807, two of frames, or the like. In some embodiments, selection of frames for back propagation includes selecting the one or more frames includes determining a scene change frame in frames subsequent to target frame 801 and selecting only frames from prior to the detected scene change frame in a display order for use in back propagation to target frame 801.

As shown with respect to back propagation structure 834, which indicates adaptive back propagation structures based on the dynamic or static nature of the video content, an indicator or measure of temporal complexity 840 is generated for a video sequence. Temporal complexity 840 may be generated for a number of future frames, on a rolling basis, or using any other techniques. As shown, when temporal complexity 840 is large (e.g., greater than a threshold), indicating dynamic content 841, a shorter lookahead distance is used for back propagation. For example, when temporal complexity 840 exceeds a threshold, only a certain number of frames may be used in back propagation such as two as illustrated, however any number may be used such as four or eight. Furthermore, in the illustrated example, performance optimized mode processing is employed with only frame 803 being used for back propagation (while frame 802 is skipped or bypassed) with use of motion vector 827. In other examples, all frames in the lookahead window are used, multiple frames at a particular frequency are used, or the like.

When temporal complexity 840 is relatively small (e.g., less than a threshold), indicating static content 842, a longer lookahead distance is used for back propagation. For example, when temporal complexity 840 does not exceed a threshold, a larger number of frames are used in back propagation such as eight as illustrated. Although illustrated using two and eight lookahead windows for dynamic content 841 and static content 842, respectively, any number of frames may be used. For example, static content 842 may indicate use of 40, 80, or more frames in the lookahead and back propagation. Furthermore, as discussed with respect to dynamic content 841, in the illustrated example performance optimized mode processing is employed with only frame 803 being used for back propagation using motion vector 826 (while frames 802-808 are skipped or bypassed). In other examples, all frames in the lookahead window are used, multiple frames at a particular frequency are used, etc. In some embodiments, such techniques may be based on a fixed GOP pattern. For examples, B frames are typically either a group of 4, 8, or 16. In some embodiments, if the frame is part of the B frame hierarchy, the frames 8 and 16 away may cover the two basic GOPs (BGOPs). Then, at the second level of the hierarchy, the frame may point at the start and the end (e.g., if at frame 4 of an 8 frame BGOP, point at −4 and +4).

Such processing may be deployed during lookahead and back propagation for groups of frames, for each frame on a rolling basis, or the like. Notably, changes in temporal complexity 840 may be detected and used to adjust frames selected for use in back propagation. In some embodiments, frames 801-809 have a first temporal complexity measure and selecting frames for back propagation includes use of a frame at first maximum temporal distance (e.g., no frame further in the display order is used) from target frame 801 and selecting frames for back propagation for a second target frame having a second temporal complexity measure such that the back propagation for the second target frames includes use of a frame at second maximum temporal distance (e.g., no frame further in the display order is used) that is greater than the first maximum temporal distance in response to the second temporal complexity measure being greater than the first temporal complexity measure.

As shown with respect to back propagation structure 835, in some embodiments complexity change 851 between adjacent frames may be measured and, when complexity change 851 exceeds a threshold (as illustrated with respect to frames 805, 806), multiple propagations may be performed: one from prior to complexity change 851 (using motion vector 829) and one from subsequent to complexity change 851 (using motion vector 828). In the illustrated example, performance optimized mode processing is used and a single frame prior to and a single frame subsequent to complexity change 851 are used. However, any number and frequency of frames from prior to complexity change 851 may be used for the first propagation and any number and frequency of frames from subsequent to complexity change 851 may be used. In some embodiments, complexity change 851 between adjacent frames such as frames 805, 806 is detected as being greater than a threshold and propagating propagation values to a target frame such as frame 801 includes propagating first propagation values from only one or more frames prior to and including frame 805 and propagating second propagation values from only one or more frames subsequent to and including frame 806.

Figure 9:
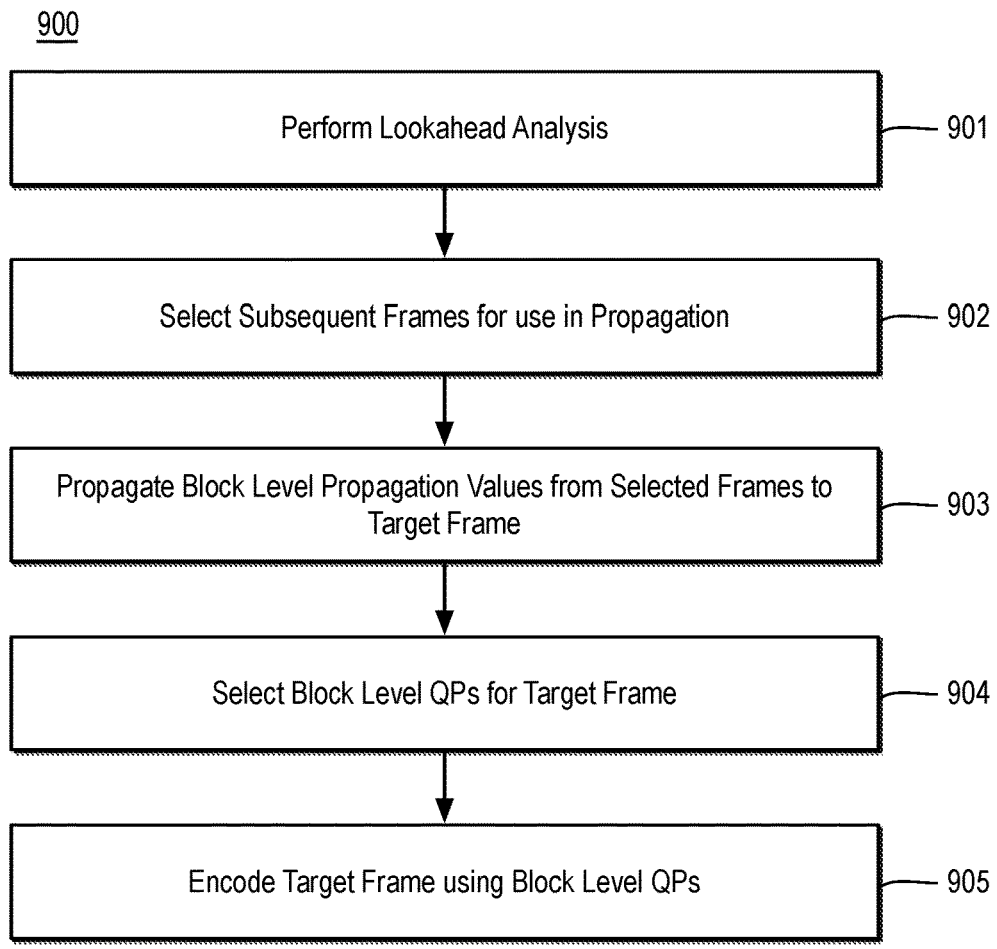
FIG. 9 is a flow diagram illustrating an example process for video coding.

FIG. 9 is a flow diagram illustrating an example process 900 for video coding, arranged in accordance with at least some implementations of the present disclosure. Process 900 may include one or more operations 901-905 as illustrated in FIG. 9. Process 900 may form at least part of a video coding process. By way of non-limiting example, process 900 may form at least part of a video coding process as performed by any device or system as discussed herein such as system 100. Furthermore, process 900 will be described herein with reference to system 1000 of FIG. 10.

Figure 10:
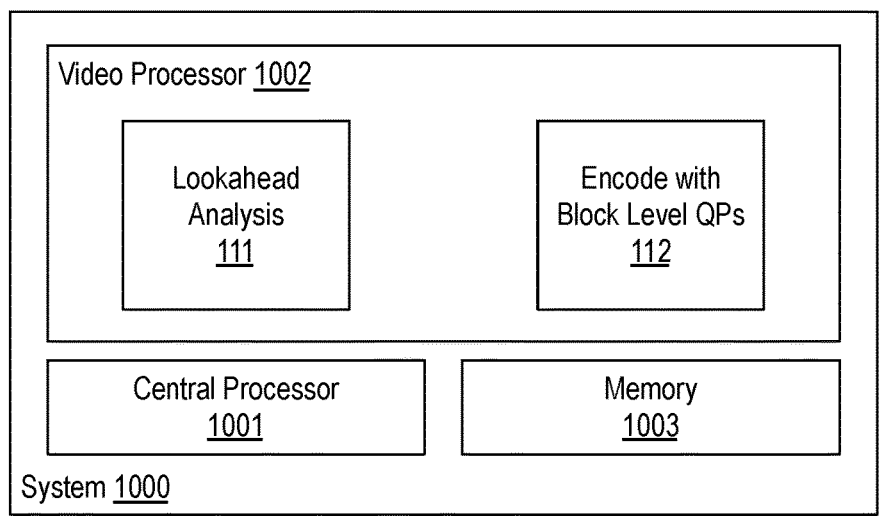
FIG. 10 is an illustrative diagram of an example system for video coding.

FIG. 10 is an illustrative diagram of an example system 1000 for video coding, arranged in accordance with at least some implementations of the present disclosure. As shown in FIG. 10, system 1000 may include a central processor 1001, a video processor 1002, and a memory 1003. Also as shown, video processor 1002 may include or implement lookahead analysis module 111 and encode module 112. For example, system 1000 may implement one or more processors to implement the techniques discussed herein. In the example of system 1000, memory 1003 may store video data or related content such as frame data, block data, block coding mode decision data, wavefront data, bitstream data, and/or any other data as discussed herein.

As shown, in some embodiments, lookahead analysis module 111 and encode module 112 are implemented via video processor 1002. In other embodiments, one or more or portions of lookahead analysis module 111 and encode module 112 are implemented via central processor 1001 or another processing unit such as an image processor, a graphics processor, or the like. Video processor 1002 may include any number and type of video, image, or graphics processing units that may provide the operations as discussed herein. Such operations may be implemented via software or hardware or a combination thereof. For example, video processor 1002 may include circuitry dedicated to manipulate frames, frame data, or the like obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory.

In an embodiment, one or more or portions of lookahead analysis module 111 and encode module 112 are implemented via an execution unit (EU). The EU may include, for example, programmable logic or circuitry such as a logic core or cores that may provide a wide array of programmable logic functions. In an embodiment, one or more or portions of lookahead analysis module 111 and encode module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 begins at operation 901, where lookahead analysis is performed for input video such that the input video includes a target frame and a number subsequent frames in a display order.

Processing continues at operation 902, where one or more of the of subsequent frames are selected for use in a propagation of block based propagation values for adjustment of block level quantization parameters (QPs) of the target frame. In some embodiments, selecting the one or more frames includes determining a scene change frame in the subsequent frames and selecting the one or more frames only from frames prior to the scene change frame in the display order. In some embodiments, selecting the one or more frames includes selecting the one or more frames at an interval that skips one or more intervening frames and propagating the propagation values is absent use of the intervening frames.

Processing continues at operation 903, where the propagation values from the selected one or more of the of subsequent frames are propagated to the target frame such that the propagation values are based on spatial and temporal distortion values from the lookahead analysis of the input video and propagated using motion estimation based on the target frame and the selected one or more of the of subsequent frames. In some embodiments, selecting the one or more frames includes detecting a complexity change greater than a threshold between first and second frame of the subsequent frames and propagating the propagation values includes propagating first propagation values from only one or more frames prior to and including the first frame and propagating second propagation values from only one or more frames subsequent to and including the second frame.

In some embodiments, the subsequent frames include a first temporal complexity measure and the selected one or more of the of subsequent frames includes a first frame at a first maximum temporal distance from the target frame, and process 900 further includes selecting, for a second target frame, one or more of a number of second subsequent frames for use in a second propagation for adjustment of second block level QPs of the second target frame such that the second subsequent frames includes a second temporal complexity measure and the selected one or more second subsequent frames include a second frame at a second maximum temporal distance from the second target frame, such that the second maximum temporal distance is greater than the first maximum temporal distance in response to the second temporal complexity measure being greater than the first temporal complexity measure.

In some embodiments, propagating the propagation values includes determining a first propagation value from a first block of a first frame is propagated to at least a second and third block of a second frame and scaling, in response to a first spatial distortion of the first block exceeding a second spatial distortion of the second block, a propagation value for the second block by a ratio of the second spatial distortion to the first spatial distortion, such that a second propagation value for the third block is not scaled in response to first spatial distortion not exceeding a third spatial distortion of the third block.

In some embodiments, the lookahead analysis has a coding order matching the display order and encode of the target frame and the subsequent frames has a group of picture (GOP) structure having a coding order other than the display order, and the propagating includes determining a number of forward and backward reference frames in the GOP structure for a first frame of the subsequent frames, at least one of the forward and backward reference frames skipping one or more frames in the display order, and propagating second propagation values, using the lookahead analysis, to the first frame from forward and backward frames in the display order and using the number of forward and backward reference frames based on the GOP structure. In some embodiments, back-propagation from a first forward frame includes dividing a first propagation value of a first block of the first forward frame to two or more values for corresponding blocks of the first frame and forward-propagation from a first backward frame includes merging second propagation values of second blocks of the first backward frame to a single value for a corresponding block of the first frame.

Processing continues at operation 904, where the block level QPs of the target frame are selected based on the propagation values, and at operation 905, where the target frame is encoded using the block level QPs. In some embodiments, selecting the block level QPs includes receiving first block level QPs for blocks of the target frame, the first block level QPs including a first number of unique block level QPs such that the first number exceeds a threshold, and repeatedly altering the block level QP values of a set of the first block level QPs corresponding to a lowest number of unique block level QPs until a number of unique block level QPs does not exceed the threshold to generate the block level QPs of the target frame.

Process 900 may be repeated any number of times either in series or in parallel for any number of video frames, videos, pieces of video content. video segments, or the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
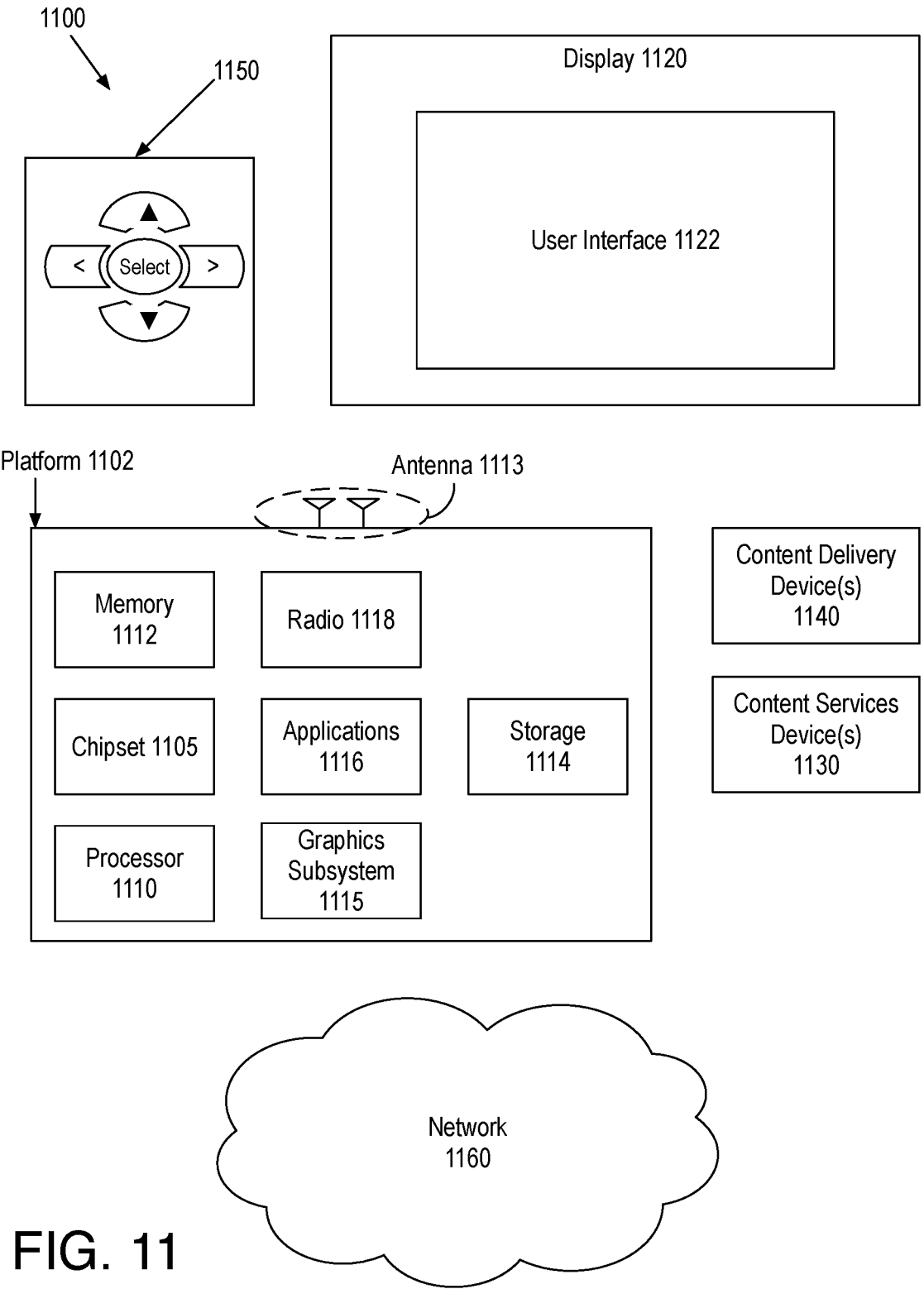
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of may be used to interact with user interface 1122, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1120) by movements of a pointer, cursor, focus ring, or other visual indicators displayed on the display. For example, under the control of software applications 1116, the navigation features located on navigation may be mapped to virtual navigation features displayed on user interface 1122, for example. In various embodiments, may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
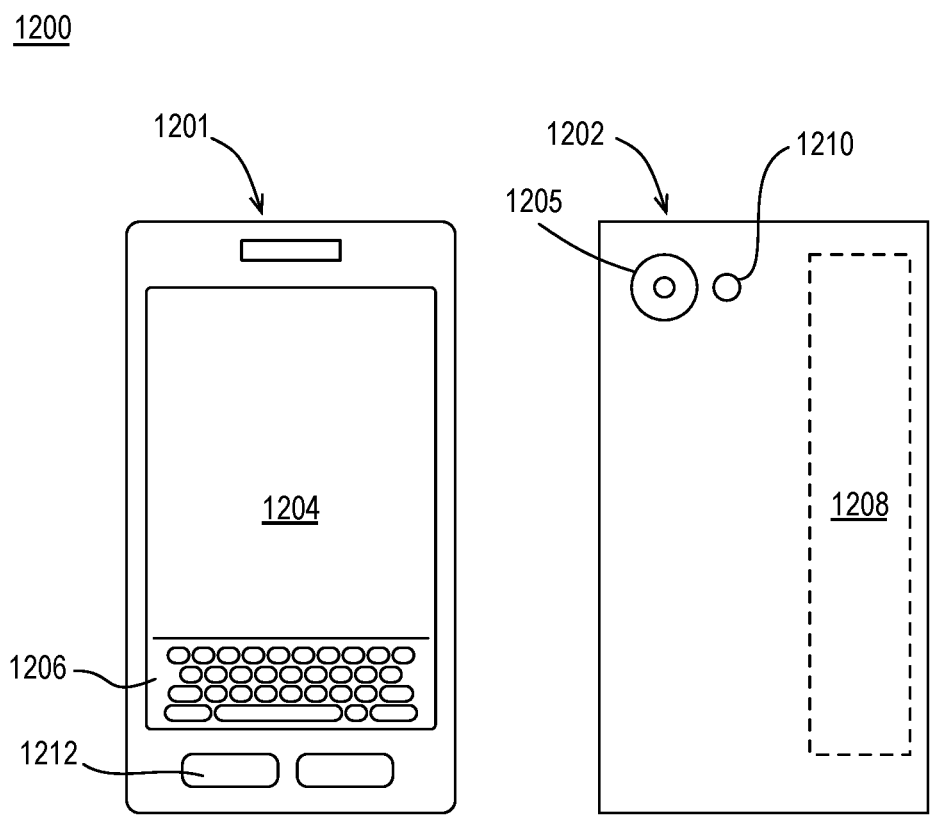
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, system 100 or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. In other examples, camera 1205 and flash 1210 may be integrated into front 1201 of device 1200 or both front and back cameras may be provided. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for video coding comprises performing lookahead analysis for input video, the input video comprising a target frame and a plurality of subsequent frames in a display order, selecting one or more of the subsequent frames for use in a propagation of block based propagation values for adjustment of block level quantization parameters (QPs) of the target frame, propagating the propagation values from the selected one or more of the subsequent frames to the target frame, the propagation values based on spatial and temporal distortion values from the lookahead analysis of the input video and propagated using motion estimation based on the target frame and the selected one or more of the subsequent frames, selecting the block level QPs of the target frame based on the propagation values, and encoding the target frame using the block level QPs.

In one or more second embodiments, further to the first embodiment, selecting the one or more frames comprises determining a scene change frame in the plurality of subsequent frames and selecting the one or more frames only from frames prior to the scene change frame in the display order.

In one or more third embodiments, further to the first or second embodiments, selecting the one or more frames comprises detecting a complexity change greater than a threshold between first and second frame of the plurality of subsequent frames and propagating the propagation values comprises propagating first propagation values from only one or more frames prior to and including the first frame and propagating second propagation values from only one or more frames subsequent to and including the second frame.

In one or more fourth embodiments, further to any of the first through third embodiments, selecting the one or more frames comprises selecting the one or more frames at an interval that skips one or more intervening frames and propagating the propagation values is absent use of the intervening frames.

In one or more fifth embodiments, further to any of the first through fourth embodiments, the plurality of subsequent frames comprises a first temporal complexity measure and the selected one or more of the subsequent frames comprises a first frame at a first maximum temporal distance from the target frame, and the method further comprises selecting, for a second target frame, one or more of a plurality of second subsequent frames for use in a second propagation for adjustment of second block level QPs of the second target frame, the second subsequent frames comprising a second temporal complexity measure and the selected one or more second subsequent frames comprising a second frame at a second maximum temporal distance from the second target frame, wherein the second maximum temporal distance is greater than the first maximum temporal distance in response to the second temporal complexity measure being greater than the first temporal complexity measure.

In one or more sixth embodiments, further to any of the first through fifth embodiments, propagating the propagation values comprises determining a first propagation value from a first block of a first frame is propagated to at least a second and third block of a second frame and scaling, in response to a first spatial distortion of the first block exceeding a second spatial distortion of the second block, a propagation value for the second block relative to a ratio of the second spatial distortion to the first spatial distortion, wherein a second propagation value for the third block is not scaled in response to first spatial distortion not exceeding a third spatial distortion of the third block.

In one or more seventh embodiments, further to any of the first through sixth embodiments, wherein the lookahead analysis uses downsampled input video and the target frame has a first distortion value based on the lookahead analysis, and the method further comprises generating a second distortion value for the target frame based on full resolution input video and increasing, in response to a ratio of the second distortion value to the first distortion value exceeding a threshold, one or more block level QPs prior to said encoding.

In one or more eighth embodiments, further to any of the first through seventh embodiments, selecting the block level QPs comprises receiving first block level QPs for blocks of the target frame, the first block level QPs comprising a first number of unique block level QPs, the first number exceeding a threshold and repeatedly altering the block level QP values of a set of the first block level QPs corresponding to a lowest number of unique block level QPs until a number of unique block level QPs does not exceed the threshold to generate the block level QPs of the target frame.

In one or more ninth embodiments, further to any of the first through eighth embodiments, altering the QP values of the set of the first block level QPs comprises moving the QP values to a lower QP value.

In one or more tenth embodiments, further to any of the first through ninth embodiments, the lookahead analysis comprises a coding order matching the display order, encode of the target frame and the plurality of subsequent frames comprises a group of picture (GOP) structure having a coding order other than the display order, and said propagating comprises determining a number of forward and backward reference frames in the GOP structure for a first frame of the plurality of subsequent frames, at least one of the forward and backward reference frames skipping one or more frames in the display order and propagating second propagation values, using the lookahead analysis, to the first frame from forward and backward frames in the display order and using the number of forward and backward reference frames based on the GOP structure.

In one or more eleventh embodiments, further to any of the first through tenth embodiments, back-propagation from a first forward frame comprises dividing a first propagation value of a first block of the first forward frame to two or more values for corresponding blocks of the first frame and forward-propagation from a first backward frame comprises merging second propagation values of second blocks of the first backward frame to a single value for a corresponding block of the first frame.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device comprising:
    a memory to store at least a portion of input video, the input video comprising a target frame and subsequent frames in a display order; and
    processor circuitry coupled to the memory, the processor circuitry to perform operations including:
        performing lookahead analysis for the input video;
        selecting one or more of the subsequent frames for use in a propagation of block based propagation values for adjustment of block level quantization parameters (QPs) of the target frame;
        propagating the block based propagation values from the selected one or more of the subsequent frames to the target frame, wherein the block based propagation values are based on spatial and temporal distortion values from the lookahead analysis of the input video, and the block based propagation values are propagated using motion estimation based on the target frame and the selected one or more of the subsequent frames;
        wherein propagating the block based propagation values comprises:
            determining that a first block based propagation value from a first block of a first frame of the subsequent frames is propagated to a second block of a second frame of the subsequent frames; and
            scaling, in response to a first spatial distortion of the first block of the first frame exceeding a second spatial distortion of the second block of the second frame, a block based propagation value for the second block relative to a ratio of the second spatial distortion to the first spatial distortion;
        selecting the block level QPs of the target frame based on the block based propagation values corresponding to blocks of the target frame; and
        encoding the target frame using the block level QPs.

2. The device of claim 1, wherein selecting the one or more of the subsequent frames comprises:
    determine a scene change frame in the subsequent frames; and
    selecting the one or more frames only from frames prior to the scene change frame in the display order.

3. The device of claim 1, wherein:
    selecting the one or more of the subsequent frames comprises detecting a complexity change greater than a threshold between a third frame and a fourth frame of the subsequent frames; and
    propagating the block based propagation values comprises propagating the block based propagation values from only one or more frames prior to and including the third frame and propagating further block based propagation values from only one or more frames subsequent to and including the fourth frame.

4. The device of claim 1, wherein;
    selecting the one or more of the subsequent frames comprises selecting the one or more frames at an interval that skips one or more intervening frames; and propagating the block based propagation values absent use of the intervening frames.

5. The device of claim 1, wherein:
the subsequent frames comprise a first temporal complexity measure;
the selected one or more of the subsequent frames comprise a third frame at a first maximum temporal distance from the target frame; and
the operations further include:
selecting, for a second target frame, one or more of a plurality of second subsequent frames for use in a second propagation for adjustment of second block level QPs of the second target frame, the second subsequent frames comprising a second temporal complexity measure and the selected one or more second subsequent frames comprising a third frame at a second maximum temporal distance from the second target frame, wherein the second maximum temporal distance is greater than the first maximum temporal distance in response to the second temporal complexity measure being greater than the first temporal complexity measure.

6. The device of claim 1, wherein:
propagating the block based propagation values comprises determining that the first block based propagation value from the first block of the first frame is propagated to a third block of the second frame; and
a second block based propagation value for the third block is not scaled in response to the first spatial distortion of the first block not exceeding a third spatial distortion of the third block.

7. The device of claim 1, wherein:
the lookahead analysis uses downsampled input video and the target frame has a first distortion value based on the lookahead analysis; and
the operations further include:
generating a second distortion value for the target frame based on full resolution input video; and
increasing, in response to a ratio of the second distortion value to the first distortion value exceeding a threshold, one or more block level QPs prior to said encoding.

8. The device of claim 1, wherein selecting the block level QPs comprises:
receiving first block level QPs for blocks of the target frame, the first block level QPs comprising a first number of unique block level QPs, the first number exceeding a threshold; and
repeatedly altering block level QP values of a set of the first block level QPs corresponding to a lowest number of unique block level QPs until an updated a number of unique block level QPs does not exceed the threshold.

9. The device of claim 8, wherein repeatedly altering the block level QP values of the set of the first block level QPs comprises moving the block level QP values to a lower QP value.

10. The device of claim 1, wherein:
the lookahead analysis comprises a coding order matching the display order;
the target frame and the subsequent frames comprise a group of picture (GOP) structure having a further coding order other than the display order; and
propagating the block based propagation values comprises:
determining a number of forward and backward reference frames in the GOP structure for a third frame of the subsequent frames, at least one of the forward and backward reference frames skipping one or more frames in the display order; and
propagating second block based propagation values, using the lookahead analysis, to the third frame from the forward and backward reference frames in the display order and using the number of the forward and backward reference frames based on the GOP structure.

11. The device of claim 10, wherein propagating the block based propagation values comprises:
dividing a first block based propagation value of a block of a first forward frame into two or more values for corresponding blocks of the third frame; and
merging second block based propagation values of blocks of a first backward frame into a single value for a corresponding block of the third frame.

12. A method for video coding comprising:
performing lookahead analysis for input video, wherein the input video comprises a target frame and subsequent frames in a display order, the lookahead analysis uses downsampled input video, and the target frame has a first distortion value based on the lookahead analysis;
generating a second distortion value for the target frame based on full resolution input video;
selecting one or more of the subsequent frames for use in a propagation of block based propagation values for adjustment of block level quantization parameters (QPs) of the target frame;
propagating the block based propagation values from the selected one or more of the subsequent frames to the target frame, wherein the block based propagation values are based on spatial and temporal distortion values from the lookahead analysis of the input video, and the block based propagation values are propagated using motion estimation based on the target frame and the selected one or more of the subsequent frames;
selecting the block level QPs of the target frame based on the block based propagation values;
increasing, in response to a ratio of the second distortion value to the first distortion value exceeding a threshold, one or more QP values of the block level QPs; and
encoding the target frame using the block level QPs.

13. The method of claim 12, wherein selecting the one or more of the subsequent frames comprises selecting the one or more frames at an interval that skips one or more intervening frames and propagating the block based propagation values is absent use of the intervening frames.

14. The method of claim 12, wherein propagating the block based propagation values comprises:
determining a first block based propagation value from a first block of a first frame is propagated to at least a second block and a third block of a second frame; and
scaling, in response to a first spatial distortion of the first block exceeding a second spatial distortion of the second block, a block based propagation value for the second block relative to a ratio of the second spatial distortion to the first spatial distortion, wherein a second block based propagation value for the third block is not scaled in response to the first spatial distortion not exceeding a third spatial distortion of the third block.

15. The method of claim 12, wherein selecting the block level QPs comprises:
receiving first block level QPs for blocks of the target frame, the first block level QPs comprising a first number of unique block level QPs, the first number exceeding a threshold; and repeatedly altering the block level QP values of a set of the first block level QPs corresponding to a lowest number of unique block level QPs until an updated number of unique block level QPs does not exceed the threshold.

16. The method of claim 12, wherein:
the lookahead analysis comprises a coding order matching the display order;
the target frame and the subsequent frames comprise a group of picture (GOP) structure having a further coding order other than the display order; and
propagating the block based propagation values comprises:
   determining a number of forward and backward reference frames in the GOP structure for a first frame of the subsequent frames, at least one of the forward and backward reference frames skipping one or more frames in the display order; and
   propagating second block based propagation values, using the lookahead analysis, to the first frame from the forward and backward reference frames in the display order and using the number of the forward and backward reference frames based on the GOP structure.

17. At least one non-transitory machine readable medium comprising a plurality of instructions that, in response to being executed on a computing device, cause the computing device to perform video coding by:
performing lookahead analysis for input video, the input video comprising a target frame and a subsequent frames in a display order;
selecting one or more of the subsequent frames for use in a propagation of block based propagation values for adjustment of block level quantization parameters (QPs) of the target frame;
propagating the block based propagation values from the selected one or more of the subsequent frames to the target frame, wherein the block based propagation values are based on spatial and temporal distortion values from the lookahead analysis of the input video, and the block based propagation values are propagated using motion estimation based on the target frame and the selected one or more of the subsequent frames;
selecting the block level QPs of the target frame based on the block based propagation values, wherein selecting the block level QPs comprises:
   receiving first block level QPs for blocks of the target frame, the first block level QPs comprising a first number of unique block level QPs, the first number exceeding a threshold; and
   repeatedly altering block level QP values of a set of the first block level QPs corresponding to a lowest number of unique block level QPs until an updated number of unique block level QPs does not exceed the threshold; and
encoding the target frame using the block level QPs.

18. The at least one non-transitory machine readable medium of claim 17, wherein selecting the one or more of the subsequent frames comprises selecting the one or more frames at an interval that skips one or more intervening frames and propagating the block based propagation values is absent use of the intervening frames.

19. The at least one non-transitory machine readable medium of claim 17, wherein propagating the block based propagation values comprises:
determining a first block based propagation value from a first block of a first frame is propagated to at least a second block and a third block of a second frame; and
scaling, in response to a first spatial distortion of the first block exceeding a second spatial distortion of the second block, a block based propagation value for the second block relative to a ratio of the second spatial distortion to the first spatial distortion, wherein a second block based propagation value for the third block is not scaled in response to the first spatial distortion not exceeding a third spatial distortion of the third block.

20. The at least one non-transitory machine readable medium of claim 17, wherein:
the lookahead analysis comprises a coding order matching the display order;
the target frame and the subsequent frames comprise a group of picture (GOP) structure having a further coding order other than the display order; and
propagating the block based propagation values comprises:
   determining a number of forward and backward reference frames in the GOP structure for a first frame of the subsequent frames, at least one of the forward and backward reference frames skipping one or more frames in the display order; and
   propagating second block based propagation values, using the lookahead analysis, to the first frame from the forward and backward reference frames in the display order and using the number of the forward and backward reference frames based on the GOP structure.

21. The at least one non-transitory machine readable medium of claim 20, wherein propagating the block based propagation values comprises:
dividing a first block based propagation value of a first block of a first forward frame to two or more values for corresponding blocks of the first frame; and
merging second block based propagation values of second blocks of a first backward frame to a single value for a corresponding block of the first frame.

* * * * *

UNITED STATES PATENT AND TRADEMARK OFFICE
CERTIFICATE OF CORRECTION

PATENT NO. : 12,348,734 B2
APPLICATION NO. : 17/347243
DATED : July 1, 2025
INVENTOR(S) : Jason Tanner et al.

It is certified that error appears in the above-identified patent and that said Letters Patent is hereby corrected as shown below:

In the Claims

In Column 28, Claim 2, Line 49, delete "determine" and insert -- determining --, therefor.

In Column 29, Claim 8, Line 51, delete "a number" and insert -- number --, therefor.

In Column 31, Claim 17, Line 31, delete "a subsequent" and insert -- subsequent --, therefor.

In Column 32, Claim 21, Line 48, delete "to" and insert -- into --, therefor.

In Column 32, Claim 21, Line 51, delete "to" and insert -- into --, therefor.

Signed and Sealed this
Sixteenth Day of September, 2025

Coke Morgan Stewart
*Acting Director of the United States Patent and Trademark Office*